US007107524B2

(12) United States Patent
Lin et al.

(10) Patent No.: US 7,107,524 B2
(45) Date of Patent: Sep. 12, 2006

(54) COMPUTER IMPLEMENTED EXAMPLE-BASED CONCEPT-ORIENTED DATA EXTRACTION METHOD

(75) Inventors: Yi-Chung Lin, Keelung (TW);
Chung-Jen Chiu, Tainan (TW)

(73) Assignee: Industrial Technology Research Institute, Hsinchu (TW)

( * ) Notice: Subject to any disclaimer, the term of this patent is extended or adjusted under 35 U.S.C. 154(b) by 497 days.

(21) Appl. No.: 10/442,300

(22) Filed: May 21, 2003

(65) Prior Publication Data
US 2004/0123237 A1    Jun. 24, 2004

(30) Foreign Application Priority Data
Dec. 24, 2002    (TW) ............................. 91137158 A

(51) Int. Cl.
*G06F 17/00*    (2006.01)
(52) U.S. Cl. ............................. 715/513; 706/55; 707/6
(58) Field of Classification Search ................ 715/513; 706/55; 707/6
See application file for complete search history.

(56) References Cited

U.S. PATENT DOCUMENTS 6,304,870 B1 * 10/2001 Kushmerick et al. .......... 707/4
6,532,469 B1 *  3/2003 Feldman et al. ............ 707/102
6,901,441 B1 *  5/2005 Bent et al. .................. 709/223
2002/0016796 A1 *  2/2002 Hurst et al. ................. 707/500

OTHER PUBLICATIONS

Wagner et al., "The String-to-String Correction Problem", Journal of the Association for Computing Machinery, vol. 21, No. 1, Jan. 1974, pp. 168-173.*
Whang, et al., "Office-by-Example: An Integrated Office System and Database Manager", ACM Transactions on Office Information Systems, vol. 5, No. 4, Oct. 1987, p. 393-427.*

* cited by examiner

*Primary Examiner*—Heather R. Herndon
*Assistant Examiner*—Amelia Rutledge
(74) *Attorney, Agent, or Firm*—Bacon & Thomas, PLLC

(57) ABSTRACT

The present invention relates to an example-based concept-orietned data extraction method. In an example labeling phase, the exemplary data string is converted into an exemplary token sequence, in which the target concepts and filler concepts are labeled to be tuples for use as an example, and thus an exemplary concept graph is constructed. In the data extraction phase, the untested data string is converted into an untested token sequence to be processed, and, based on the associated concept recognizers defined by the tuples in the example labeling phase, it is able to detect the concept candidates and establish the composite concepts and aggregate concepts, thereby constructing a hypothetical concept graph. After comparing the exemplary concept graph with the hypothetical concept graph, the optimal hypothetical concept sequence in the hypothetical graph is determined, so as to extract the targeted data from the matched target concepts.

18 Claims, 17 Drawing Sheets

| Currency | Buy Check | Sell Check | Buy Cash | Sell Cash |
|---|---|---|---|---|
| USD | 33.65400 | 33.74500 | 33.44500 | 33.94500 |

```
1:  <html>              15: Buy Cash         29: 33.74500
2:  <body>              16: </td>            30: </td>
3:  <table border=1>    17: <td>             31: <td>
4:  <tr>                18: Sell Cash        32: 33.44500
5:  <td>                19: </td>            33: </td>
6:  Currency            20: </tr>            34: <td>
7:  </td>               21: <tr>             35: 33.94500
8:  <td>                22: <td>             36: </td>
9:  Buy Check           23: USD              37: </tr>
10: </td>               24: </td>            38: </table>
11: <td>                25: <td>             39: </body>
12: Sell Check          26: 33.64500         40: </html>
13: </td>               27: </td>
14: <td>                28: <td>
```

| | | |
|---|---|---|
| 1: <html> | 15: Buy Cash | 29: 33.75500 |
| 2: <body> | 16: </td> | 30: </td> |
| 3: <table border=1> | 17: <td> | 31: <td> |
| 4: <tr> | 18: Sell Cash | 32: 33.45500 |
| 5: <td> | 19: </td> | 33: </td> |
| 6: Curreycy | 20: </tr> | 34: <td> |
| 7: </td> | 21: <tr> | 35: 33.95500 |
| 8: <td> | 22: <td> | 36: </td> |
| 9: Buy Check | 23: USD | 37: </tr> |
| 10: </td> | 24: </td> | 38: </table> |
| 11: <td> | 25: <td> | 39: </body> |
| 12: Sell Check | 26: 33.65500 | 40: </html> |
| 13: </td> | 27: </td> | |
| 14: <td> | 28: <td> | |

FIG. 6

| Tuple | Concept Name / Concept Candidate |
|---|---|
| $T_{A1}$ | BUY_CASH |
| | BUY_CASH(26,26),<br>BUY_CASH(29,29),<br>BUY_CASH(32,32),<br>BUY_CASH(35,35) |
| $T_{A2}$ | SELL_CASH |
| | SELL_CASH(26,26),<br>SELL_CASH(29,29),<br>SELL_CASH(32,32),<br>SELL_CASH(35,35) |
| $T_{A3}$ | \<html\>*\<td\> |
| | \<html\>*\<td\>(1,5),<br>\<html\>*\<td\>(1,8),<br>\<html\>*\<td\>(1,11),<br>\<html\>*\<td\>(1,14),<br>\<html\>*\<td\>(1,17),<br>\<html\>*\<td\>(1,22),<br>\<html\>*\<td\>(1,25),<br>\<html\>*\<td\>(1,28),<br>\<html\>*\<td\>(1,31),<br>\<html\>*\<td\>(1,34) |
| $T_{A4}$ | \</td\>\<td\> |
| | \</td\>\<td\>(7,8),<br>\</td\>\<td\>(10,11),<br>\</td\>\<td\>(13,14),<br>\</td\>\<td\>(16,17),<br>\</td\>\<td\>(24,25),<br>\</td\>\<td\>(27,28),<br>\</td\>\<td\>(30,31),<br>\</td\>\<td\>(33,34) |

| Tuple | Concept Name / Concept Candidate |
|---|---|
| $T_{A5}$ | \</td\>*\</html\> |
| | \</td\>*\</html\>(7,40),<br>\</td\>*\</html\>(10,40),<br>\</td\>*\</html\>(13,40),<br>\</td\>*\</html\>(16,40),<br>\</td\>*\</html\>(19,40),<br>\</td\>*\</html\>(24,40),<br>\</td\>*\</html\>(27,40),<br>\</td\>*\</html\>(30,40),<br>\</td\>*\</html\>(33,40),<br>\</td\>*\</html\>(36,40) |
| $T_{A6}$ | \<html\>\<body\>*\</td\>\<td\> |
| | \<html\>\<body\>*\</td\>\<td\>(1,8),<br>\<html\>\<body\>*\</td\>\<td\>(1,11),<br>\<html\>\<body\>*\</td\>\<td\>(1,14),<br>\<html\>\<body\>*\</td\>\<td\>(1,17),<br>\<html\>\<body\>*\</td\>\<td\>(1,25),<br>\<html\>\<body\>*\</td\>\<td\>(1,28),<br>\<html\>\<body\>*\</td\>\<td\>(1,31),<br>\<html\>\<body\>*\</td\>\<td\>(1,34) |
| $T_{A8}$ | \</td\>\</tr\>*\</body\>\</html\> |
| | \</td\>\</tr\>*\</body\>\</html\>(19,40),<br>\</td\>\</tr\>*\</body\>\</html\>(36,40) |

FIG. 7

| Curreycy | Buy Cash | Sell Cash |
|---|---|---|
| USD | 33.44500 | 33.94500 |
| JPD | 0.27920 | 0.28620 |
| AUD | 17.93000 | 18.53000 |
| EUR | 32.73000 | 33.75000 |

```
1:  <html>              22: </td>              43: 17.93000
2:  <head>              23: <td>               44: </td>
3:  <body>              24: 33.94500           45: <td>
4:  <table border=1>    25: </td>              46: 18.53000
5:  <tr>                26: </tr>              47: </td>
6:  <td>                27: <tr>               48: </tr>
7:  Curreycy            28: <td>               49: <tr>
8:  </td>               29: JPD                50: <td>
9:  <td>                30: </td>              51: EUR
10: Buy Cash            31: <td>               52: </td>
11: </td>               32: 0.27920            53: <td>
12: <td>                33: </td>              54: 32.73000
13: Sell Cash           34: <td>               55: </td>
14: </td>               35: 0.28620            56: <td>
15: </tr>               36: </td>              57: 33.75000
16: <tr>                37: </tr>              58: </td>
17: <td>                38: <tr>               59: </tr>
18: USD                 39: <td>               60: </table>
19: </td>               40: AUD                61: </body>
20: <td>                41: </td>              62: </html>
21: 33.44500            42: <td>
```

FIG. 13

| Curreycy | Buy Cash | Sell Cash |
|---|---|---|
| USD | 33.44000 | 33.94000 |
| JPD | 0.27900 | 0.28600 |
| EUR | 32.72000 | 33.74000 |

```
1:  <html>              18: USD             35: 0.28600
2:  <head>              19: </td>           36: </td>
3:  <body>              20: <td>            37: </tr>
4:  <table border=1>    21: 33.44000        38: <tr>
5:  <tr>                22: </td>           39: <td>
6:  <td>                23: <td>            40: EUR
7:  Curreycy            24: 33.94000        41: </td>
8:  </td>               25: </td>           42: <td>
9:  <td>                26: </tr>           43: 32.72000
10: Buy Cash            27: <tr>            44: </td>
11: </td>               28: <td>            45: <td>
12: <td>                29: JPD             46: 33.74000
13: Sell Cash           30: </td>           47: </td>
14: </td>               31: <td>            48: </tr>
15: </tr>               32: 0.27900         49: </table>
16: <tr>                33: </td>           50: </body>
17: <td>                34: <td>            51: </html>
```

FIG. 16

COMPUTER IMPLEMENTED EXAMPLE-BASED CONCEPT-ORIENTED DATA EXTRACTION METHOD

BACKGROUND OF THE INVENTION

1. Field of the Invention

The present invention relates to the technical field of data extraction, and, more particularly, to an example-based concept-oriented data extraction method that is adapted to free texts, such as the source code of web pages, or general articles.

2. Description of Related Art

Currently, with the development of information technology and the explosion of World Wide Web (WWW), more and more information is available online. There are a lot of web pages providing various useful information, such as weather forecast, stock quote, book price, and so on. However, these web pages are human-readable, but not machine-understandable. The information on the web pages is hard to be manipulated by machine. One way to handle web information more effectively is extracting data from web pages to populate databases for further manipulation.

The conventional approach for extracting data from web pages is to write application-specific programs, named wrappers, which are able to locate data of interest on particular web pages. But writing wrappers is a tedious, error-prone, and time-consuming process. Furthermore, the wrapper programs are usually not reusable once the formatting convention of the targeted web pages changes. In such case, the painful wrapper writing process has to be repeated.

Conventionally, many methods have been proposed to facilitate generating wrappers automatically or semi-automatically for solving the laborious and error-prone problems of handcrafting wrappers. These methods can be classified into two approaches. The first approach is developing languages specially designed to assist users in constructing wrappers. The other approach is using labeled examples to generate wrappers.

Although using specially designed languages to build wrappers can more or less reduce the effort, it still inherits the drawbacks of manually building wrappers with general purpose languages, such as Perl and Java. While in the example-based approach, it consists of two phases: rule induction and data extraction. In the rule induction phase, some possible contextual rules are generated to specify the local contextual patterns around the labeled data. Then, in the data extraction phase, these contextual rules are then used to locate and extract the targeted data on new web pages. This approach is based on an assumption that the inducted contextual rules are able to precisely locate the targeted data. However, due to the imperfect rule induction or insufficient examples, the inducted rules sometimes also locate undesired data. This kind of errors may propagate and make the data extractor fail to grab the targeted data, even though the contexts of the targeted data satisfy the contextual rules. Besides, in the prior-art, the representation form of contextual rules is predefined and the inducted rules must be strictly obeyed. As a result, the user must label a lot of examples so that all possible contexts around the targeted data can be taken into account.

SUMMARY OF THE INVENTION

The object of the present invention is to provide an example-based concept-oriented data extraction method for simplifying the process of establishing specific concepts and concept rules of examples so as to increase practicality without handling the complicated contextual patterns of the data of interest.

Another object of the present invention is to provide an example-based concept-oriented data extraction method for defining the exemplary data string as flexible and practical examples to accurately and efficiently extract the targeted data from the untested data string after the format of the untested data string has been changed without bothering the user to specify a lot of examples.

To achieve these and other objects of the present invention, the example-based concept-oriented data extraction method comprises a first procedure for labeling an exemplary data string, and a second procedure for extracting targeted data from an untested data string.

The first procedure comprises the steps of: (A1) capturing an exemplary data string; (A2) tokenizing the exemplary data string into a plurality of tokens as an exemplary token sequence, each token having an index; (A3) specifying the exemplary token sequence as a plurality of specific concepts, each being labeled to be a tuple and consisting of at least one token, the specific concept being selected from the group of a target concept and a filler concept, the target concept pointing to the targeted data of interest, the filler concept pointing to the contextual data of the targeted data, each tuple having a format including concept type, a concept name, a beginning index of the first token in the specific concept, an ending index of the last token in the specific concept, and an associated concept recognizer of the specific concept, wherein the associated concept recognizer is provided to recognize the possible token sequence of the specific concept; and (A4) constructing an exemplary concept graph of the exemplary data string according to the tuples.

The second procedure comprises the steps of: (B1) capturing an untested data string; (B2) tokenizing the untested data string into a plurality of tokens as an untested token sequence; (B3) using the associated concept recognizers defined by the tuples for detecting a plurality of concept candidates, wherein each concept candidate having a format including the beginning index and the ending index of the corresponding token sequence, and the concept name of the concept candidate; (B4) constructing a preliminary concept graph of the untested token sequence according to the concept candidates; and (B5) determining an optimal hypothetical concept sequence by comparing the exemplary concept graph with the preliminary concept graph and capturing at least one matched target concept from the optimal hypothetical concept sequence for extracting the targeted data.

Other objects, advantages, and novel features of the invention will become more apparent from the following detailed description when taken in conjunction with the accompanying drawings.

BRIEF DESCRIPTION OF THE DRAWINGS

FIG. 3 is a schematic drawing of an example web page in the first embodiment according to the present invention;

FIG. 4 schematically illustrates the exemplary token sequence of the example web page illustrated in FIG. 3;

FIG. 6 schematically illustrates an untested token sequence of the first embodiment according to the present invention;

FIG. 7 is a list of concept candidates of the first embodiment according to the present invention;

FIG. 12 is a schematic drawing of an example web page in the second embodiment according to the present invention;

FIG. 13 schematically illustrates the exemplary token sequence of the example web page illustrated in FIG. 12;

FIG. 15 is a schematic drawing of an untested web page in the second embodiment according to the present invention;

FIG. 16 schematically illustrates the untested token sequence of the untested web page illustrated in FIG. 15;

DETAILED DESCRIPTION OF THE PREFERRED EMBODIMENT

The example-based concept-oriented data extraction method according to the present invention consists of two phases: an example labeling phase for labeling an exemplary data string, and a data extraction phase for extracting targeted data from an untested data string. The data string is preferably a text-based document, such as an article, or hypertext markup language (HTML) source codes. Each character in the data string could be an ASCII code, a binary value between 0 and 255, or a two-byte Unicode. In the following two preferred embodiments, the exemplary data string and the untested data string are HTML source codes, and each character is an ASCII code.

The First Embodiment

Figure 1:
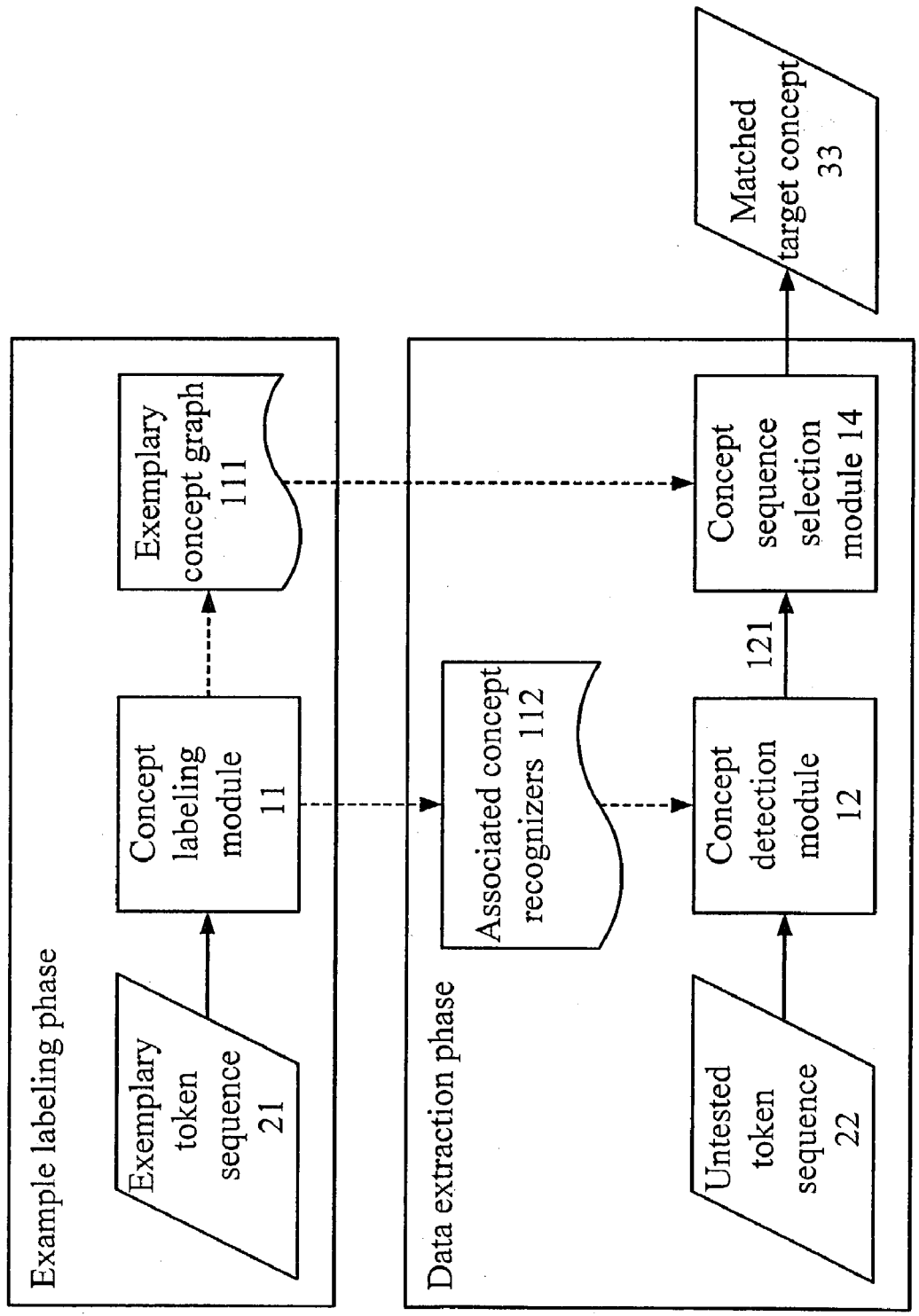
FIG. 1 is a functional block diagram of the first embodiment according to the present invention.
Figure 2:
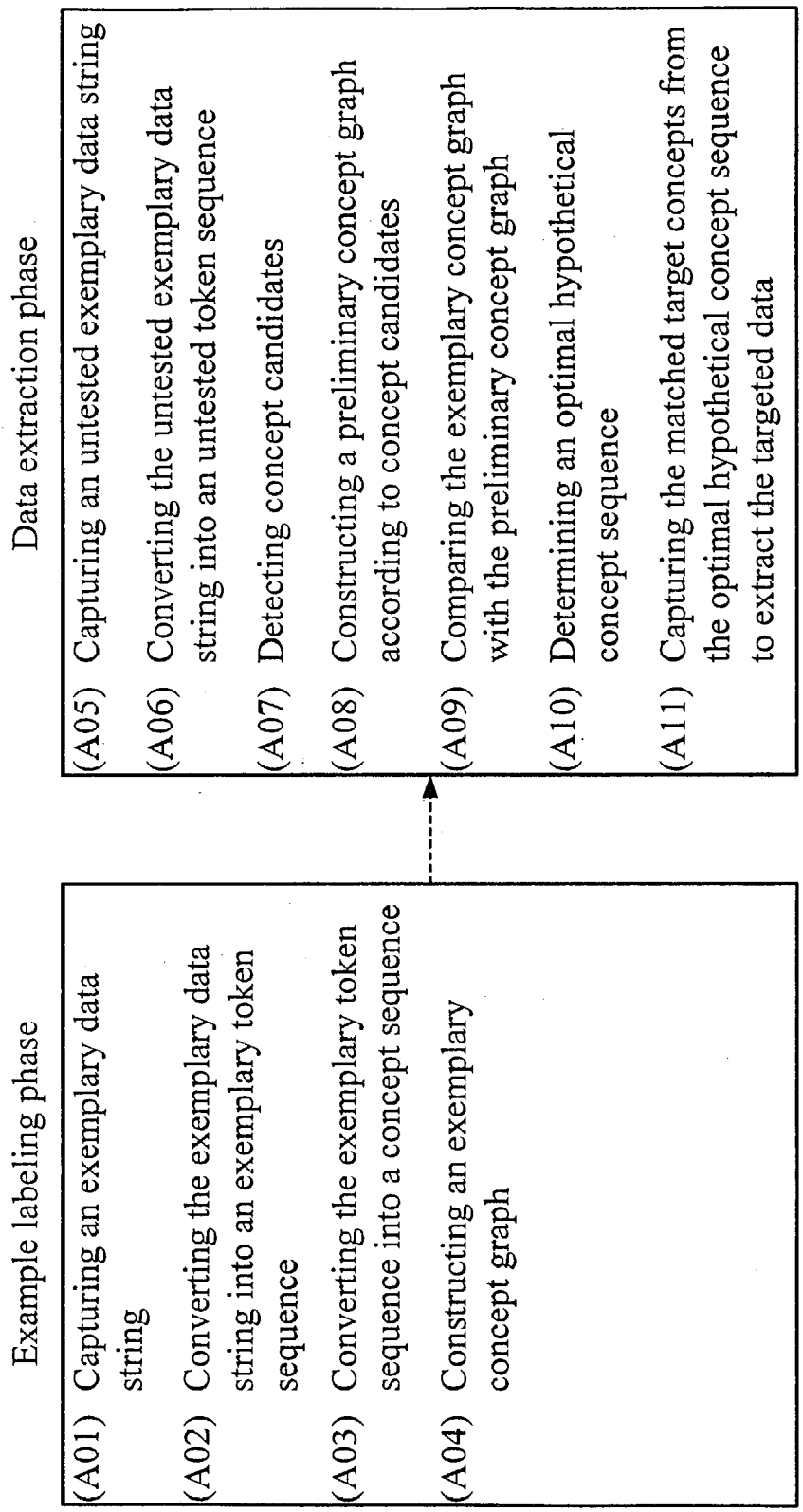
FIG. 2 is a flowchart of the first embodiment according to the present invention.

Referring to FIGS. 1 and 2, the method disclosed in the first embodiment is applied in a computer system for extracting the targeted data, where the computer system has a concept labeling module 11, a concept detection module 12, and a concept sequence selection module 14 as shown in FIG. 1. In this embodiment, the data of interest, namely, the targeted data, is the value of the exchange rate of buying US dollars in cash (i.e., 33.44500) from the example web page as shown in FIG. 3. Since the content of the web page has been defined as not only the exchange rates of buying and selling US dollars in check and in cash, but also a lot of tags for regulating the format of the web page, the HTML source code (i.e., the exemplary data string) of the example web page must be captured first in the example labeling phase (step A01) for enabling the computer system to precisely extract the exchange rate of buying US dollars in cash from web pages with this kind of format. Then, the computer system tokenizes the HTML source code into a plurality of tokens as an exemplary token sequence 21 as shown in FIG. 4 (step A02), wherein each token has been sequentially assigned an index. In this embodiment, the exemplary token sequence 21 has 40 tokens sequentially assigned an index from 1 to 40, and each token is a HTML tag or a text segment between HTML tags. It is noted that if the source documents are free texts, the exemplary data string could be tokenized into words.

Then, the user uses the concept labeling module 11 to specify the exemplary token sequence 21 into a plurality of specific concepts, each consisting of at least one token as a concept sequence, and labels each specific concept as a tuple (step A03) to tell the computer system which targeted data to be extracted, wherein each tuple represents an example. In this embodiment, the specific concept could be a target concept pointed to the targeted data, or a filler concept pointed to the contextual data of the targeted data. The format of a tuple can be recorded as follows:

(Concept-Type, Concept-Name, Beginning-Token-Index, Ending-Token-Index, Associated-Concept-Recognizer), wherein the beginning index is the first token in the specific concept, the ending index is the last token in the specific concept, and the associated concept recognizer 112 is adapted for recognizing the token sequence having the same format with the tuple, for example, a number recognizer, or a dynamically generated recognizer (DGR) . . . etc. The associated concept recognizer 112 is either user-provided (i.e., provided by the user) or system-provided (i.e., provided by the computer system).

The user uses the graphical user interface (GUI) tool in the first embodiment to facilitate the process of specifying the exchange rate of buying US dollars in cash "33.44500" as a target concept to be recorded as the following tuple:

Tuple $T_{A1}$: (Target, BUY_CASH, 32, 32, Number_Recognizer).

The tuple $T_{A1}$ means that this example is an target concept. The name of this target concept is "BUY_CASH". This target concept spans from 32nd token to 32nd token, and this concept should be recognized by the recognizer named "Number_Recognizer" adapted for recognizing numeral characters.

Furthermore, the user is also allowed to specify the filler concepts. Labeling a filler concept is similar to labeling a target concept, except that the Concept-Type is "Filler". For example, the user may specify a filler concept with the following tuple:

Tuple $T_{A2}$: (Filler, SELL_CASH, 35, 35, Number_Recognizer).

That is, the user wishes the exchange rate of selling US dollars in cash not to be extracted from the web page by the computer system, and therefore specifies it as a filler concept to be regarded as the contextual data of the targeted data.

After the user labels the target concepts and the filler concepts in the exemplary token sequence 21, the computer system will automatically label the tokens which are not included in the labeled examples as filler concepts. Each automatically labeled filler concept will be associated to some (at least one) dynamically generated recognizers (DGR). In this embodiment, after the user specifies the above two examples, three segments of tokens remain uncovered. They will be treated as filler concepts to be recorded as the tuples listed below:

Tuple $T_{A3}$: (Filler, <html>*<td>, 1, 31, _DGR{<html>*<td>});

Tuple $T_{A4}$: (Filler, </td><td>, 33, 34, _DGR{</td><td>}); and

Tuple $T_{A5}$: (Filler, </td>*</html>, 36, 40, _DGR{</td>*</html>}).

Tuple $T_{A3}$ means that the segment spanning from the first token (i.e., leading token) to the 31st token (i.e., ending token) is a filler concept whose name is "<html>*<td>" which is automatically generated by the combination of the content of the first token "<html>" and the content of the 31st token "<td>". The last element (i.e., Associated-Concept-Recognizer) in tuple $T_{A3}$ indicates that this filler concept can be recognized by a recognizer driven by the rule "<html>*<td>", where the wildcard "*" represents any positive number of tokens. Likewise, tuple $T_{A4}$ means that the segment spanning from the 33rd token to the 34th token is filler concept whose name is "</td><td>", and tuple $T_{A5}$ means that the segment spanning from the 36th token to the 40th token is a filler concept whose name is "</td>*</html>". There is no wildcard "*" in tuple $T_{A4}$ because the corresponding segment consists of only two tokens. In the same way, if the associated concept recognizer 112 is constructed according to the leading two tokens and the ending two tokens of the filler concept, the following three tuples will be produced for the three uncovered segments:

Tuple $T_{A6}$: (Filler, <html><body>*</td><td>, 1, 31, _DGR{<html><body>*</td><td>});

Tuple $T_{A7}$: (Filler, </td><td>, 33, 34, _DGR{</td><td>}); and

Tuple $T_{A8}$: (Filler, </td></tr>*</body></html>, 36, 40, _DGR{</td></tr>*</body></html>}).

It is also noted that there is no wild card in tuple $T_{A7}$ because the number of tokens in the corresponding segment is less than four. In fact, tuple $T_{A7}$ is the same as tuple $T_{A4}$.

Of course, the concept labeling module 11 can construct tuples for the uncovered segments with different criteria, such as constructing concept recognizer according to leading three tokens and ending three tokens. Furthermore, if the user specifies a specific concept without explicitly associating it to an associated concept recognizer 112, the concept labeling module 11 of the computer system will automatically produce one according to the tokens on the left-hand side and on the right-hand side of the specific concept specified by the user.

Figure 5:
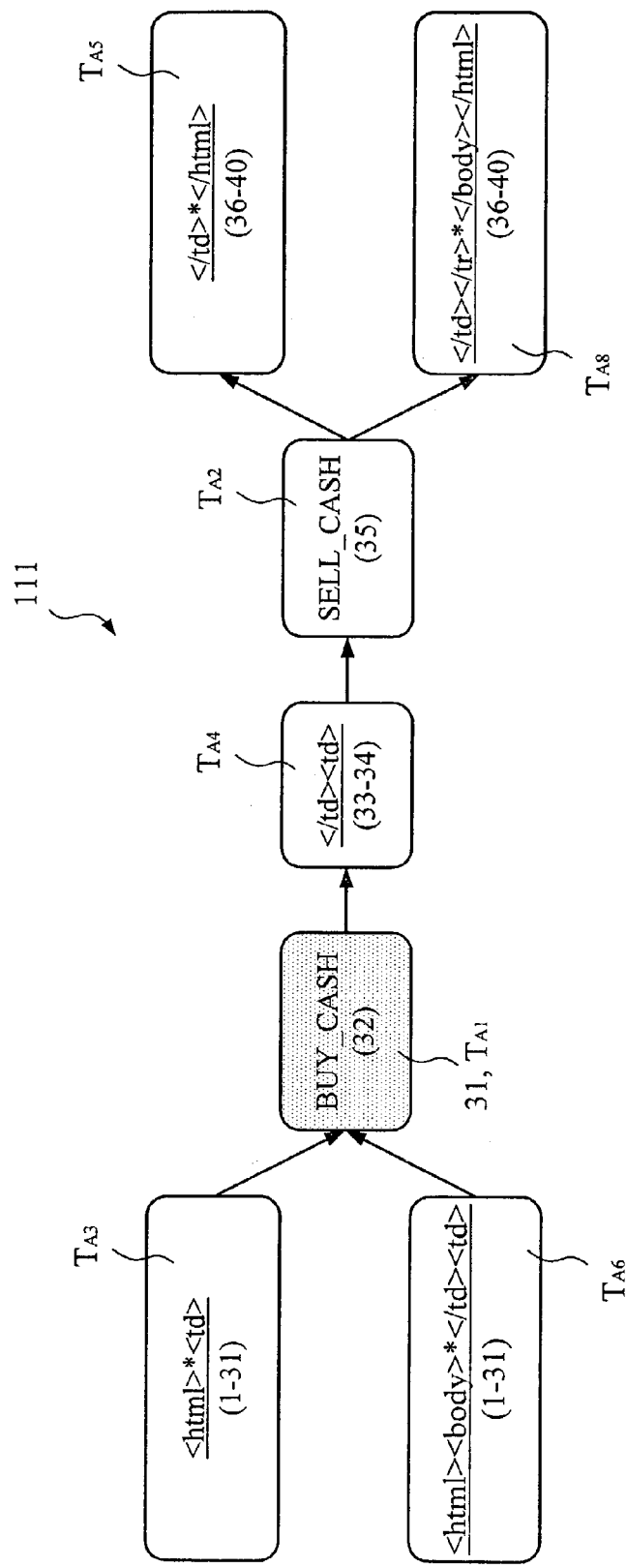
FIG. 5 is an exemplary concept graph of the first embodiment according to the present invention.

After all tokens in the exemplary token sequence 21 have been specified as specific concepts, an exemplary concept graph 111 as shown in FIG. 5 is constructed by the concept labeling module 11 according to the beginning token index and the ending token index of the tuples specified by the user and automatically generated by the computer system (step A04). Referring to FIG. 5, the exemplary concept graph 111 is constructed according to tuple $T_{A1}$ and tuple $T_{A2}$ assigned by the user, and tuple $T_{A3}$, tuple $T_{A4}$, tuple $T_{A5}$, tuple $T_{A6}$, and tuple $T_{A8}$ automatically generated by the computer system, where tuple $T_{A7}$ is ignored because it is the same as tuple $T_{A4}$. The tuple $T_{A1}$ is the target concept 31 while the other tuples are filler concepts. Hence, the example labeling phase would be accomplished after constructing the exemplary concept graph 111.

After obtaining the exemplary concept graph 111 by labeling the exemplary token sequence 21, the computer system is ready to capture untested data string from new web pages (step A05). In the data extraction phase, the untested data string (namely, the HTML source code) is also tokenized into an untested token sequence 22 as shown in FIG. 6 before further processing (step A06). Then, the concept detection module 12 refers to the associated concept recognizers 112 defined by the tuples in the example labeling phase for detecting a plurality of concept candidates from the untested token sequence 22 (step A07). The format of a concept candidate can be recorded as follows:

Concept-Name (Beginning-Token-Index, Ending-Token-Index).

The detailed list of concept candidates of this embodiment is shown in FIG. 7. Since the user associates the tuple $T_{A1}$ of the target concept "BUY_CASH" with the associated concept recognizer 112 "Number_Recognizer", the following four concept candidates are generated from the untested token sequence 22: BUY_CASH(26,26), BUY_CASH(29,29), BUY_CASH(32,32), BUY_CASH(35,35). Likewise, since the user also associates the tuple $T_{A2}$ of the filler concept "SELL_CASH" with the associated concept recognizer 112 "Number_Recognizer", the following four concept candidates are also generated: SELL_CASH(26,26), SELL_CASH(29,29), SELL_CASH(32,32), SELL_CASH(35,35). Other concept candidates are also generated according to aforementioned way. It should be noted that different concept candidates might cover the same token(s).

Figure 8:
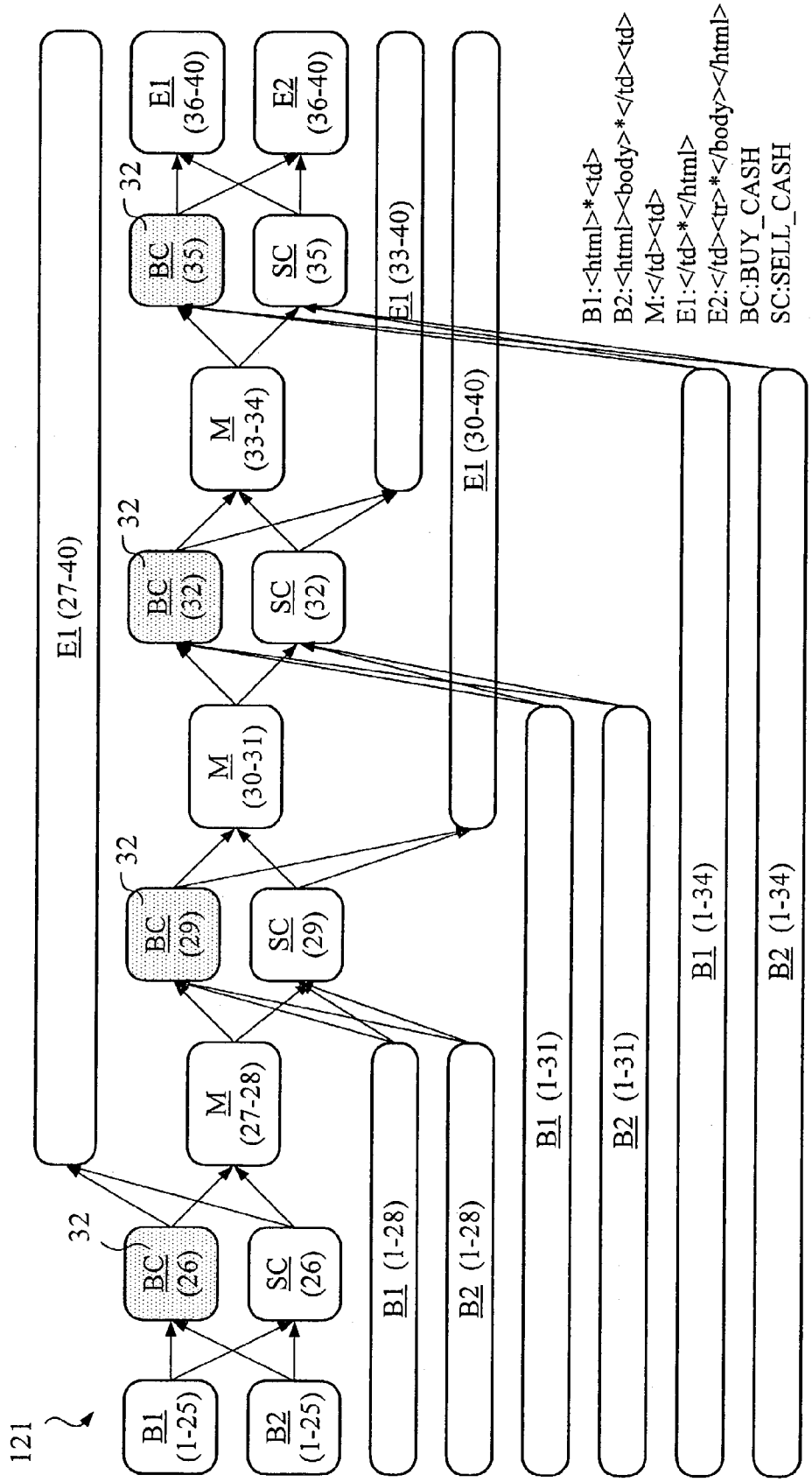
FIG. 8 is a preliminary concept graph of the first embodiment according to the present invention.

After excluding the isolated concept candidates in FIG. 7, the concept detection module 12 then constructs a (simplified) preliminary concept graph 121 as shown in FIG. 8 (step A08). In this embodiment, the isolated concept candidate represents that it cannot be connected with any other concept candidates. For example, the ending token index of the concept candidate "<html>*<td>(1,5)" is "5" (that is, the last token of the concept candidate is the 5th token in the untested token sequence 22), and there is no concept candidate having "6" as beginning concept index (that is, the first token of the concept candidate is the 6th token in the untested token sequence 22). Thus, the concept candidate "<html>*<td>(1,5)" is not a valid one, namely, the concept candidate "<html>*<td>(1,5)" is an isolated concept candidate, and has no need to be depicted in the preliminary concept graph 121.

Figure 9:
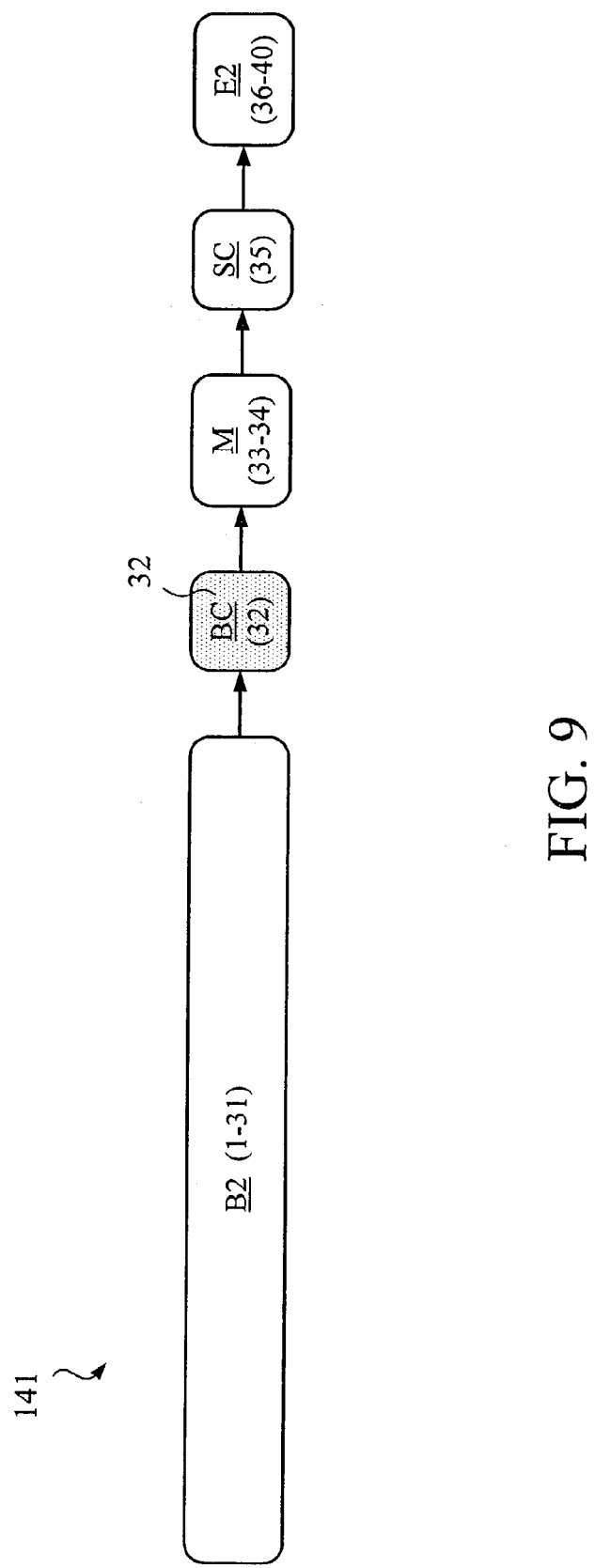
FIG. 9 schematically illustrates an optimal hypothetical concept sequence of the first embodiment according to the present invention.

The preliminary concept graph 121 is then sent to the concept sequence selection module 14 for comparing the preliminary concept graph 121 in FIG. 8 with the exemplary concept graph 111 in FIG. 5 by applying the dynamic programming technique (step A09) to determine an optimal hypothetical concept sequence 141 as shown in FIG. 9 (step A10). Finally, the matched target concept 33 (identical to the target concept 32 shown in FIG. 9) is captured from the optimal hypothetical concept sequence 141 so as to extract the target data (step A11). Therefore, the 32nd token in the untested token sequence 22 belonging to the target concept "BUY_CASH" shown in FIG. 6 is captured according to the target concept 32 for extracting the exchange rate of buying US dollars in cash "33.45500".

In the aforesaid step A09 of this embodiment, with the dynamic programming technique, the costs of different edit operations, such as deleting a concept x, inserting a concept x and substituting a concept x with y, are defined. The preferable definition of the costs of edit operations is defined as follows:

$$\text{cost}(x, y) = \begin{cases} 1, & \text{if } x = \phi(\text{insertion}) \\ 1, & \text{if } y = \phi(\text{deletion}) \\ 1, & \text{if } x, y \neq \phi \text{ and } x \neq y(\text{substitution}) \\ 0, & \text{if } x, y \neq \phi \text{ and } x = y \end{cases}$$

where x is a hypothetical concept, y is an exemplary concept, and x=y means that x and y have the same concept name, otherwise x and y have different concept name.

The user is allowed to choose one of the system-provided definitions or to define her/his own. In addition to simply setting the costs of all kinds of edit operations to be 1, the definition of the edit operations could be also defined as follows:

$$\text{cost}(x, y) = \begin{cases} \frac{2}{\pi} \times \tan^{-1}\left(\frac{|n_x - n_y|}{\varepsilon \times \min(n_x, n_y)}\right), & \text{if } x, y \neq \phi \text{ and } x = y, \\ 1 \end{cases}$$

otherwise where $n_x$ is the number of tokens in the hypothetical concept x, $n_y$ is the number of tokens in the exemplary concept y, and $\varepsilon$ is a variable to control the sensitivity of cost on the difference between $n_x$ and $n_y$.

The Second Embodiment

Figure 10:
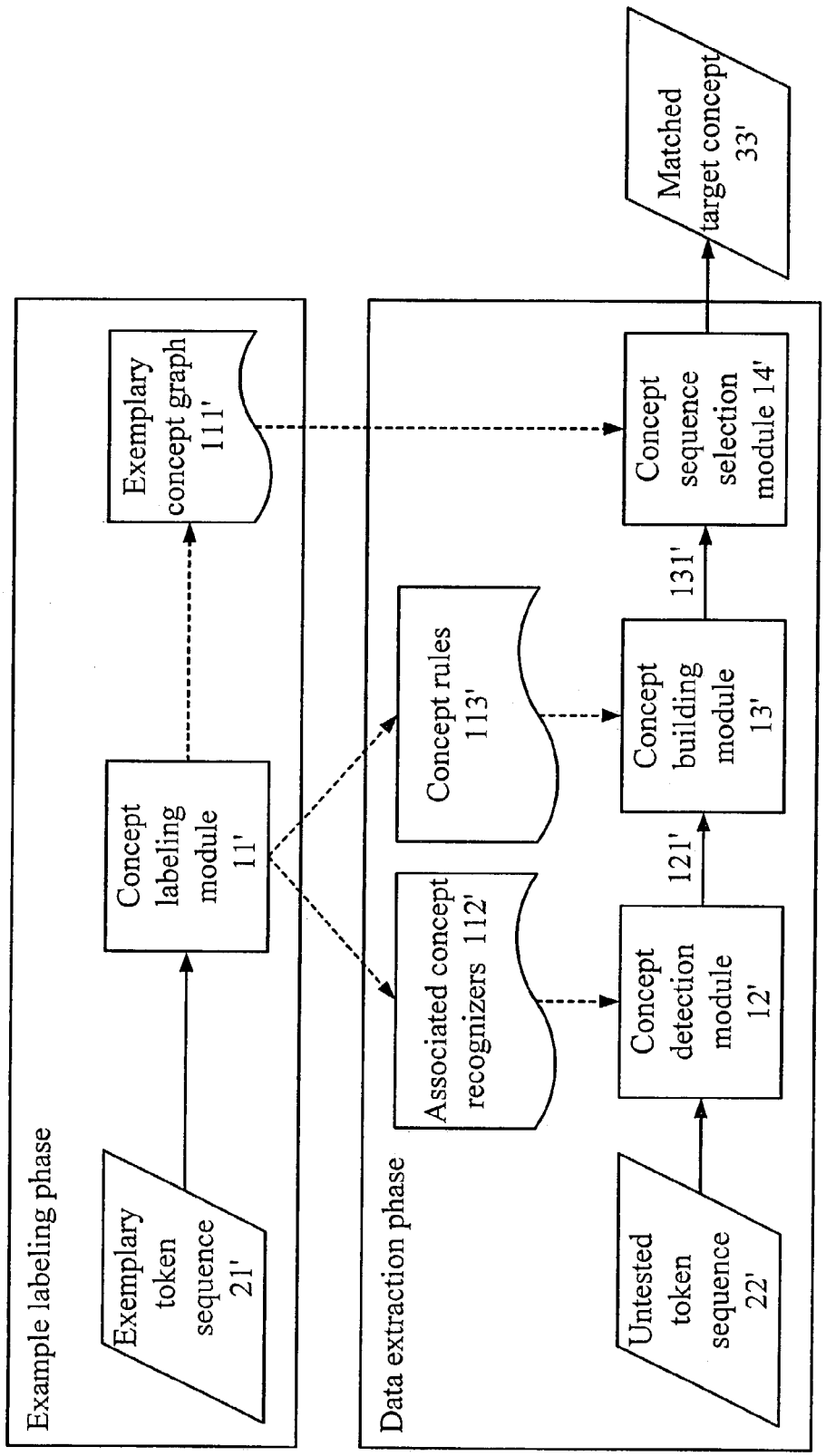
FIG. 10 is a functional block diagram of the second embodiment according to the present invention.
Figure 11:
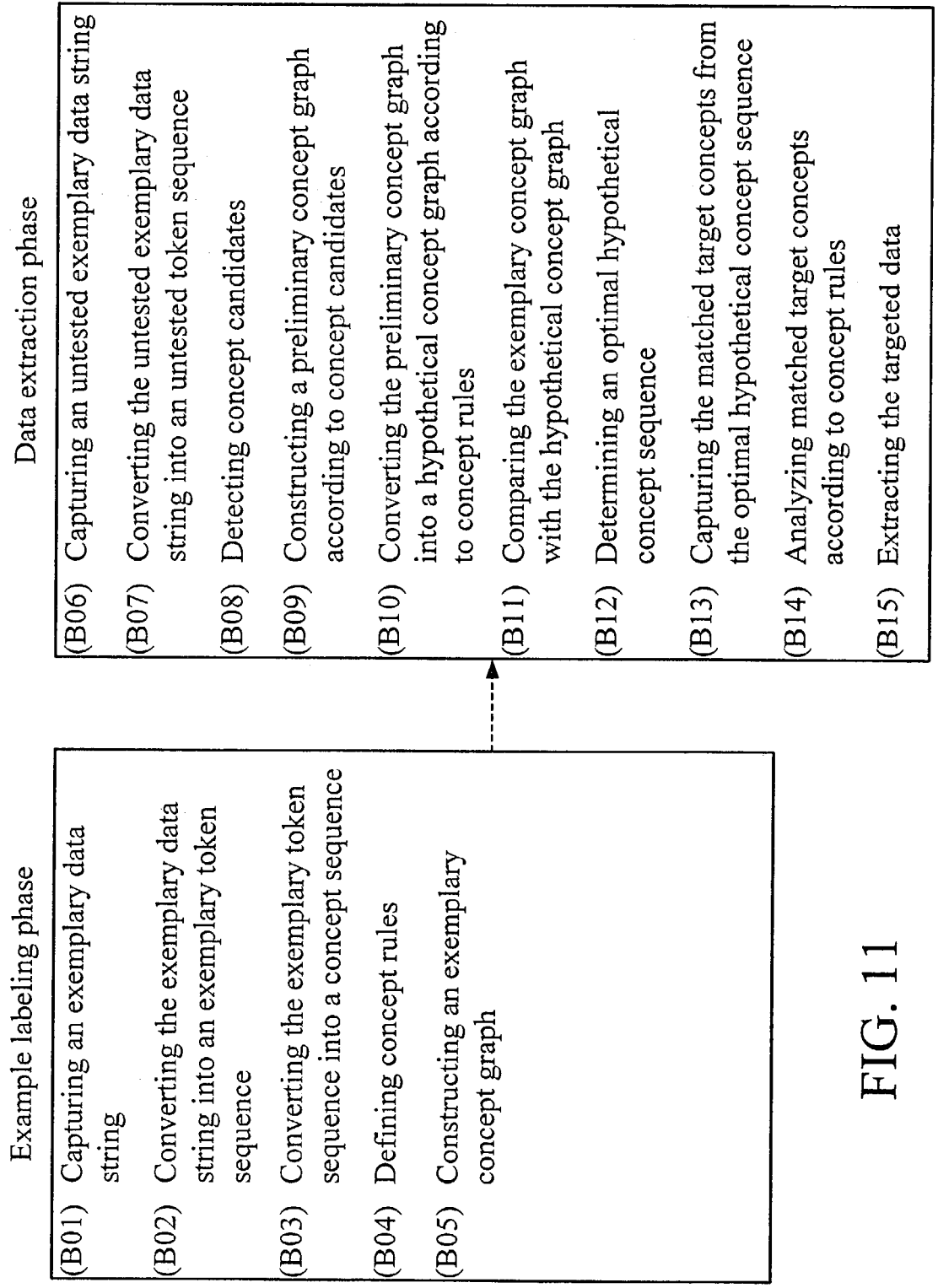
FIG. 11 is a flowchart of the second embodiment according to the present invention.

With reference to FIGS. 10 and 11, the second embodiment is basically the same as the first embodiment, except that the computer system further has a concept building module 13'. In this embodiment, the concept labeling module 11' also defines some concept rules 113' for specifying composite concepts composed a plurality of specific concepts. By this way, that the user can label the data of interest efficiently even if targeted data of interest are all the elements in a table. For example, if the user wants to extract all of the currency names (including USD, JPD, AUD, and EUR) and the exchange rates of different currencies as targeted data of the example web page as shown in FIG. 12, he/she must respectively specifies a total amount of 12 target concepts as examples (including 4 currency names, 4 rates of buying cash, and 4 rates of selling cash) according to the aforementioned method disclosed in the first embodiment. To relieve this burden, context-free rules are used to enable the user to define and specify composite concepts easily in the second embodiment. Thus, to extract the total amount of 12 target concepts in the example web page, the user only needs to specify 7 tuples.

Referring to FIG. 11, in the example labeling phase of this embodiment, the computer system also captures the HTML source code of the example web page as shown in FIG. 12 (step B01), and tokenizes the HTML source code into a plurality of tokens as the exemplary token sequence 21' (step B02). Then, the exemplary token sequence 21' is converted into a plurality of specific concepts as a concept sequence (step B03). The tuples specified by the user in step B03 comprises the following 7 tuples:

Tuple $T_{B1}$: (Target, NAME, 18, 18, Three_Uppercase_Letter_Recognizer);
Tuple $T_{B2}$: (Target, BUY, 21, 21, Number_Recognizer);
Tuple $T_{B3}$: (Target, SELL, 24, 24, Number_Recognizer);
Tuple $T_{B4}$: (Target, RECORD, 18, 24, GenerateNormalRule[$T_{B1}$, $T_{B2}$, $T_{B3}$]);
Tuple $T_{B5}$: (Target, RECORD, 29, 35, DoNothing);
Tuple $T_{B6}$: (Target, RECORD+, 18, 35, GenerateNormalRule[$T_{B4}$, $T_{B5}$]); and
Tuple $T_{B7}$: (Target, RECORD+, 18, 57, DoNothing).

Tuple $T_{B4}$ indicates that the sequence of tokens 18 to 24 is an example of the composite concept "RECORD". The associated concept recognizer 112' in tuple $T_{B4}$ (i.e., GenerateNormalRule[$T_{B1}$, $T_{B2}$, $T_{B3}$]) is a command, which indicates that this "RECORD" example consists of the examples specified by tuple $T_{B1}$, tuple $T_{B2}$, and tuple $T_{B3}$. Since tuple $T_{B4}$ is associated from the 18th token to the 24th token, tuple $T_{B1}$ is associated with the 18th token, tuple $T_{B2}$ is associated with the 21st token, and tuple $T_{B3}$ is only associated with the 24th token in the exemplary token sequence 21', the computer system will automatically generate the following fillers concepts (assuming that the computer system automatically generates the recognizer of a filler concept according to the first token and the last token of the filler concept):

Tuple $T_{B8}$: (Filler, </td><td>, 19, 20, _DGR{</td><td>}); and
Tuple $T_{B9}$: (Filler, </td><td>, 22, 23, _DGR{</td><td>}).

Therefore, the computer system will automatically generate the following context-free-rule to define the format of the composite concept of tuple $T_{B4}$:

Rule $C_1$: RECORD→NAME</td><td>BUY</td><td>SELL.

That is, the format of the specific concept "RECORD" has to follow the format defined by rule $C_1$.

Tuple $T_{B5}$ indicates that the sequence of tokens 29 to 35 is also an example of the "RECORD" concept as tuple $T_{B4}$. Because rule $C_1$ has been generated by the computer system, it is not necessary to redefine a new context-free rule for tuple $T_{B5}$. Thus, the associated concept recognizer 112' is the command "DoNothing", which notifies the computer system of not automatically generating associated concept recognizer 112' for this example.

Tuple $T_{B6}$ indicates that the sequence of tokens 18 to 35 is an example of a special kind of composite concept "RECORD+", which represents one or more records. This special kind of composite concept is also named aggregate concept. The associated concept recognizer 112' in tuple $T_{B6}$ (i.e., GenerateNormalRule[$T_{B4}$, $T_{B5}$]) is a command, which specifies that this "RECORD+" example consists of the examples specified by tuple $T_{B4}$ and tuple $T_{B5}$. As a result, the computer system automatically generates the following tuple:

Tuple $T_{B10}$: (Filler, </td>*<td>, 25, 28, _DGR{</td>*<td>}).

This command also tells the computer system to generate rules for this "RECORD+" example. Therefore, the computer system generates the following context-free rules to represent concept of one or more records:

Rule $C_2$: (RECORD+→RECORD); and
Rule $C_3$: (RECORD+→RECORD+</td>*<td>RECORD).

The last user-specified tuple (i.e., tuple $T_{B7}$) indicates that the sequence of tokens 18 to 57 is also an example of the aggregate concept "RECORD+" as tuple $T_{B6}$. Since all-user-specified tuples are processed, the system will generate the following tuples to cover the uncovered segments in the untested token sequence 22':

Tuple $T_{B11}$: (Filler, <html><body>*<tr><td>, 1, 17, _DGR{<html><body>*<tr><td>}); and
Tuple $T_{B12}$: (Filler, </td></tr>*</body></html>, 58, 62, _DGR {</td></tr>*</body></html>}).

It should be noted that although all the concept rules in this embodiment are generated by the computer system, the user is also allowed to define concept rules to specify the relation between tuples.

Figure 14:
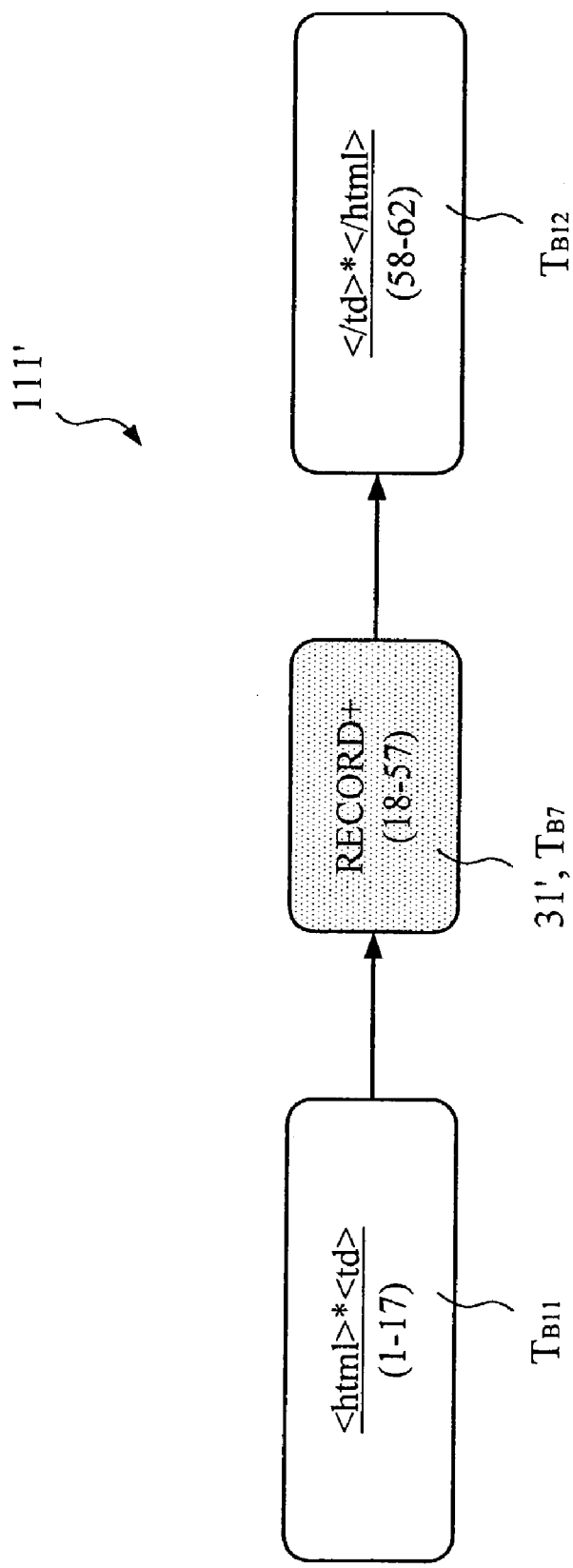
FIG. 14 is an exemplary concept graph of the second embodiment according to the present invention.

After all tokens in the exemplary token sequence 21' have been specified as specific concepts, an exemplary concept graph 111' as shown in FIG. 14 is constructed by the concept labeling module 11' according to the beginning token index and the ending token index of the tuples specified by the user and automatically generated by the computer system (step B05). It should be noted that the concepts specified by tuple $T_{B1}$ to tuple $T_{B6}$ are not used to construct the exemplary concept graph 111' because the concept specified by tuple $T_{B7}$ covers the concepts specified by tuple $T_{B1}$ to tuple $T_{B6}$.

Figure 17:
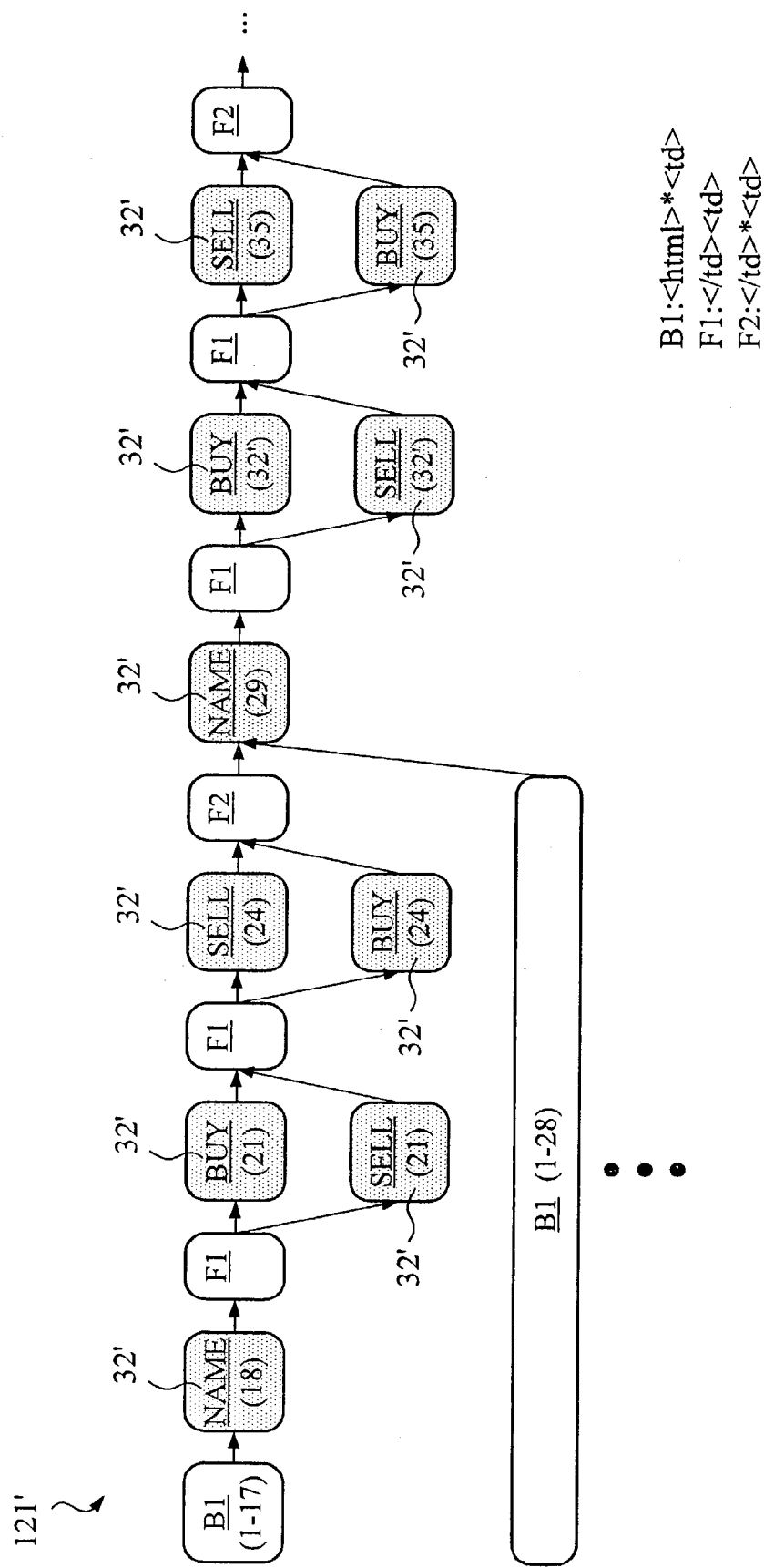
FIG. 17 is a preliminary concept graph of the second embodiment according to the present invention.

After the example labeling phase is finished, the computer system begins to extract targeted data from new documents. In the data extraction phase, the computer system first captures the HTML source code of the web page as shown in FIG. 15 (step B06), and tokenizes the HTML source code into the untested token sequence 22' as shown in FIG. 16 (step B07). After the concept detection module 12' defines concept candidates (step B08) and constructs the preliminary concept graph 121' as shown in FIG. 17 (step B09), the preliminary concept graph 121' is then converted into a hypothetical concept graph 131' as shown in FIG. 18 by the concept building module 13' using the concept rules 113' generated in the example labeling phase (step B10).

Figure 18:
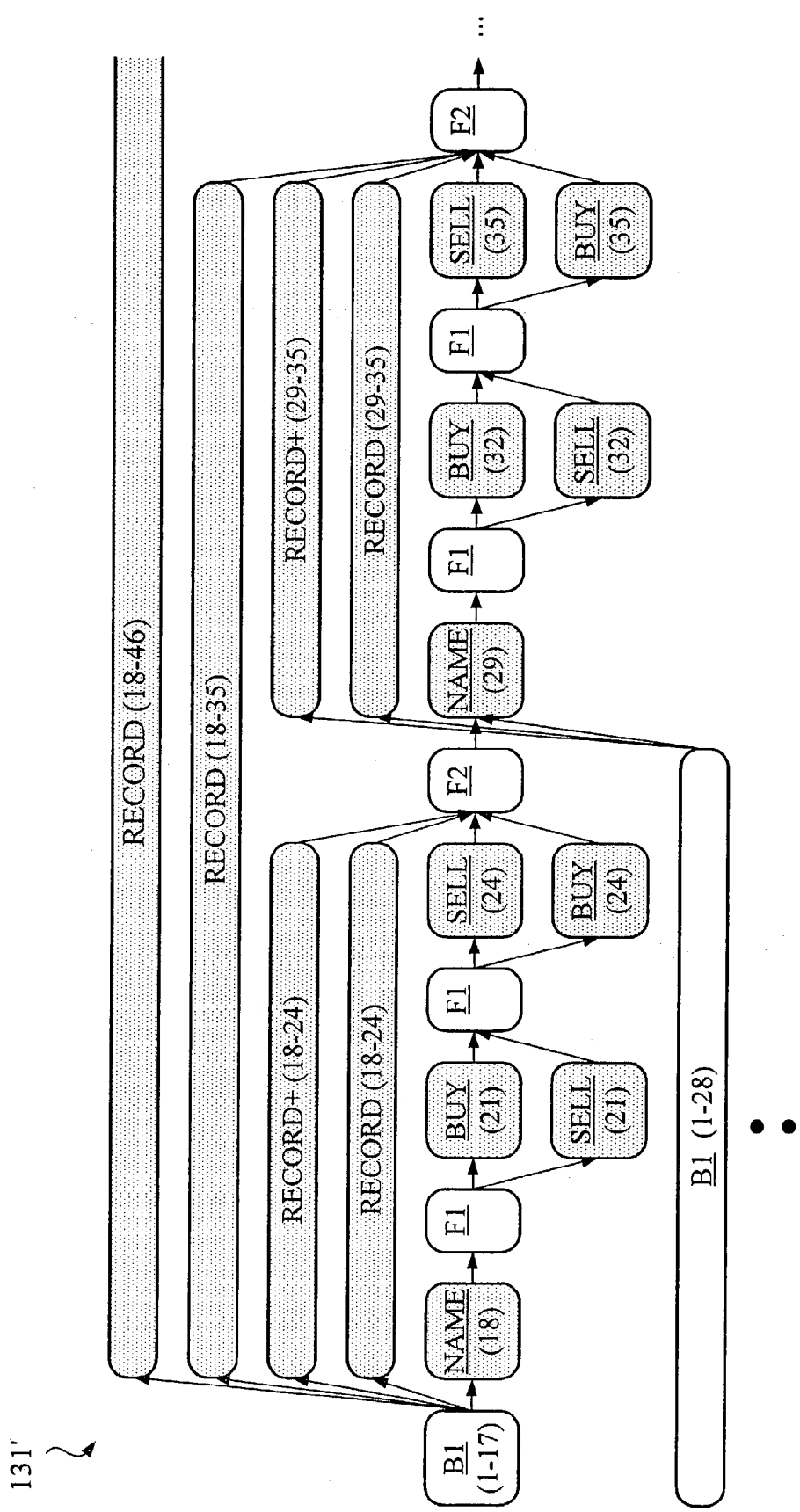
FIG. 18 is a hypothetical concept graph of the second embodiment according to the present invention.
Figure 19:
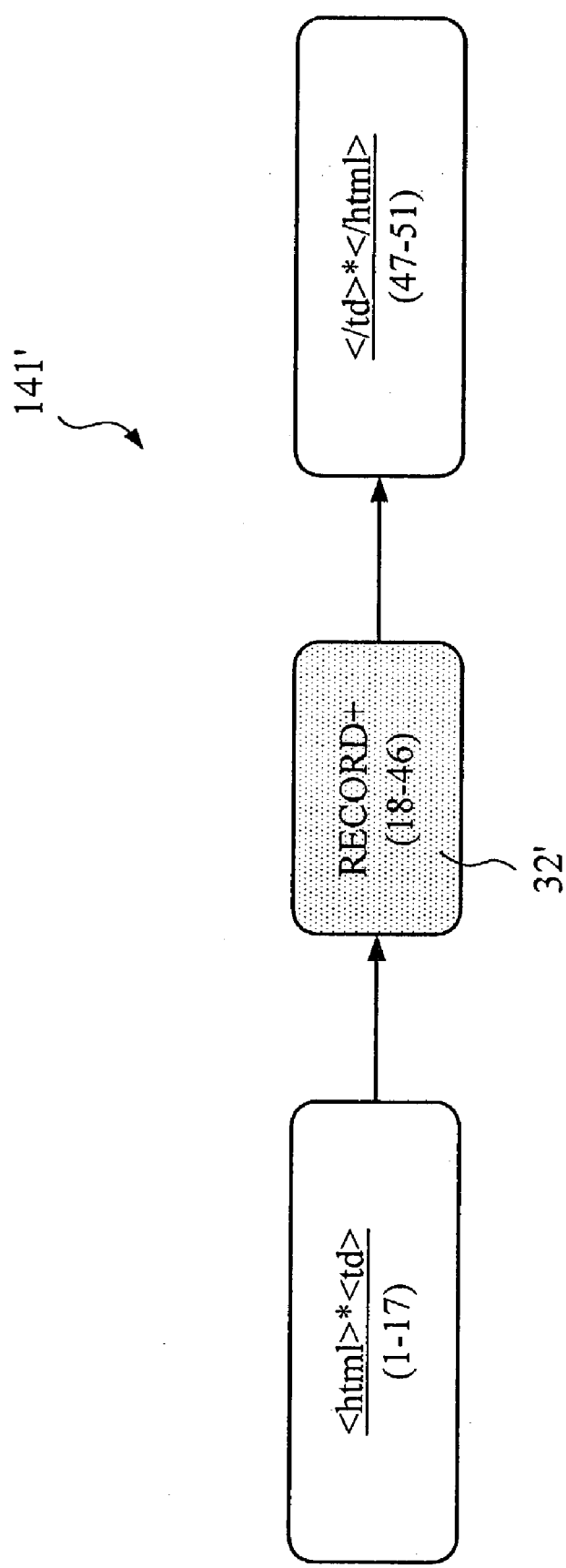
FIG. 19 schematically illustrates an optimal hypothetical concept sequence of the second embodiment according to the present invention.
Figure 20:
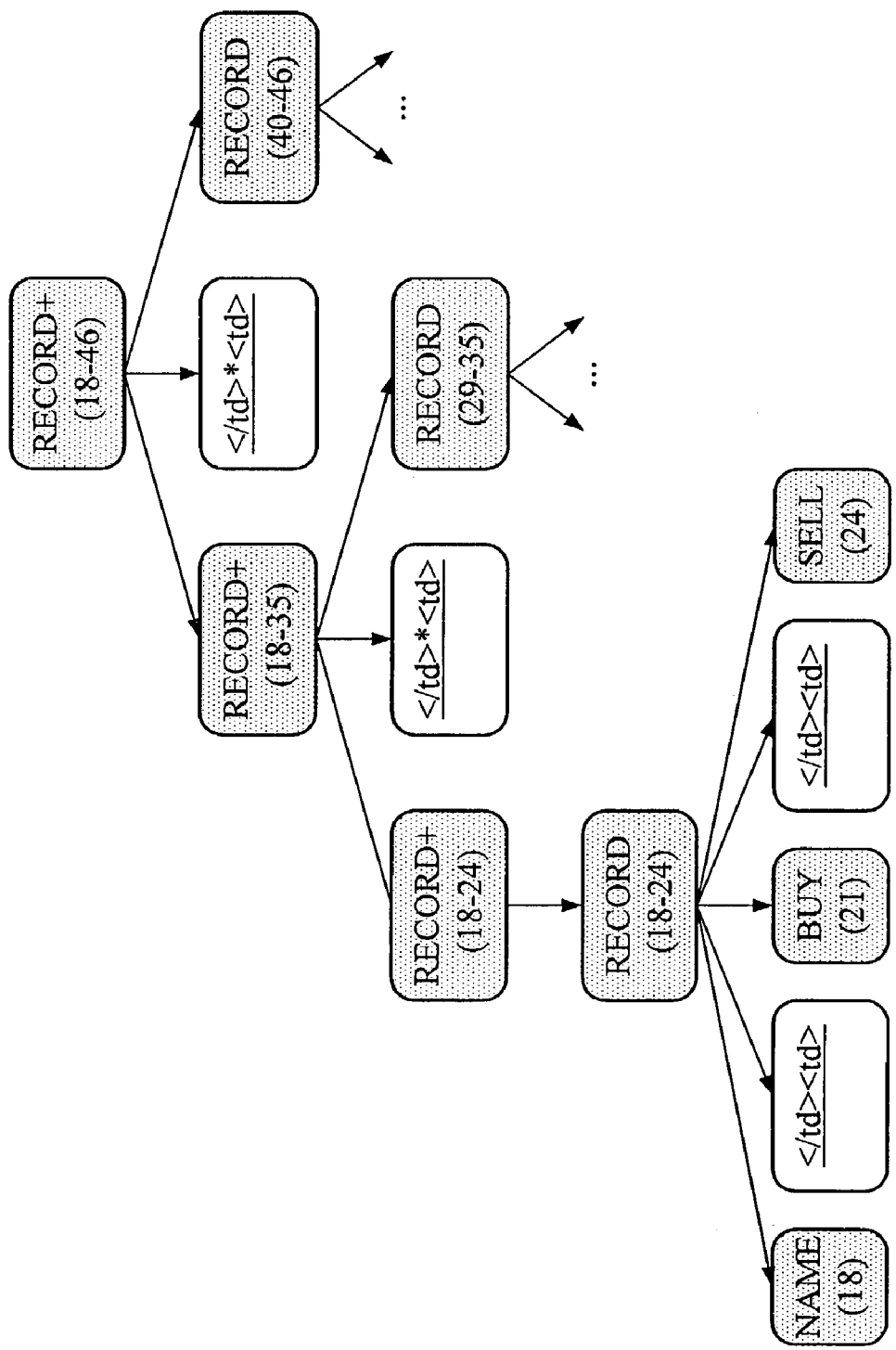
FIG. 20 is a schematic drawing of the structure of the matched target concept of the second embodiment according to the present invention.

The hypothetical concept graph 131' is then sent to the concept sequence selection module 14' for comparing the hypothetical concept graph 131' in FIG. 18 with the exemplary concept 111' in FIG. 14 by applying the dynamic programming technique (step B11) to determine an optimal hypothetical concept sequence 141' as shown in FIG. 19 (step B12). Next, the matched target concept 33' (identical to the target concept 32' shown in FIG. 19) is extracted from the optimal hypothetical concept sequence 141' (step B13). As a result, the matched target concept 33' in this embodiment is an aggregate concept, and it has to be spanned as illustrated in FIG. 20 based on the afore-determined concept rules (step B14) for enabling the computer system to extract the targeted data (step B15). That is, with reference to FIG. 16, the computer system can extract the currency names (corresponding to the target concept "NAME"), the exchange rates of buying cash (corresponding to the target concept "BUY"), and the exchange rates of selling cash (corresponding to the target concept "SELL") from the untested token sequence 22'.

According to the above-mentioned description, it is known that, in the present invention, the user only needs to specify the targeted data of interest as examples in the example labeling phase (namely, the user is allowed to specify target concepts and filler concepts) for enabling the computer system to efficiently predict the location of the targeted data in the untested token sequence based on the user-specified examples. Even if the convention of web page is slightly changed, the method described in the present invention still can accurately extract targeted data. For example, in the second embodiment, the example web page shown in FIG. 12 records the exchange rates of four kinds of currencies with 62 tokens being tokenized, while the untested web page shown in FIG. 15 records the exchange rates of only three kinds of currencies with 51 tokens being tokenized. But the computer system still can precisely extract the exchange rates of USD, JPD, and EUR according to the definition of specific concepts and concept rules. Therefore, the present invention provides a highly-practical and flexible method which is able to extract data of interest without asking the user to specify too many exmaples.

Although the present invention has been explained in relation to its preferred embodiment, it is to be understood that many other possible modifications and variations can be made without departing from the spirit and scope of the invention as hereinafter claimed.

What is claimed is:

1. A computer implemented example-based concept-oriented data extraction method, comprising:
   a first procedure for labeling an exemplary data string, comprising the steps of:
   capturing an exemplary data string;
   tokenizing the exemplary data string into a plurality of tokens as an exemplary token sequence, each token having an index;
   specifying the exemplary token sequence as a plurality of specific concepts, each being labeled to be a tuple and consisting of at least one token, the specific concept being selected from the group of a target concept and a filler concept, the target concept pointing to the targeted data of interest, the filler concept pointing to the contextual data of the targeted data, each tuple having a format including a concept type, a concept name, a beginning index of the first token in the specific concept, an ending index of the last token in the specific concept, and an associated concept recognizer of the specific concept, wherein the associated concept recognizer is provided to recognize the possible token sequence of the specific concept; and
   constructing an exemplary concept graph of the exemplary data string according to the tuples; and
   a second procedure for extracting targeted data from an untested data string, comprising the steps of:
   capturing an untested data string;
   tokenizing the untested data string into a plurality of tokens as an untested token sequence;
   using the associated concept recognizers defined by the tuples for detecting a plurality of concept candidates, wherein each concept candidate has a format including the beginning index and the ending index of the corresponding token sequence, and the concept name of the concept candidate;
   constructing a preliminary concept graph of the untested token sequence according to the concept candidates; and
   determining an optimal hypothetical concept sequence by comparing the exemplary concept graph with the preliminary concept graph and capturing at least one matched target concept from the optimal hypothetical concept sequence for extracting the targeted data.

2. The method as claimed in claim 1, wherein the exemplary data string and the untested data string are HTML source codes.

3. The method as claimed in claim 2, wherein in the step of tokenizing the exemplary data string into a plurality of tokens, the tokens comprise HTML tags and text segments between HTML tags.

4. The method as claimed in claim 1, wherein the exemplary data string and the untested data string are articles.

5. The method as claimed in claim 4, wherein in the step of tokenizing the exemplary data string into a plurality of tokens, each token is a word.

6. The method as claimed in claim 1, wherein in the step of determining an optimal hypothetical concept sequence, a dynamic programming technique is applied for comparing the exemplary concept graph with the preliminary concept graph for determining the optimal hypothetical concept sequence.

7. The method as claimed in claim 6, wherein the dynamic programming technique uses a cost function for calculating the cost of an edit operation which is selected from the group of insertion, deletion, and substitution, and the cost function is as follows:

where x is a hypothetical concept, y is an exemplary concept, and x=y means x and y have the same concept name.

8. The method as claimed in claim 6, wherein the dynamic programming technique uses a cost function for calculating the cost of an edit operation which is selected from the group of insertion, deletion, and substitution, and the cost equation is as follows:

where $n_x$ is the number of tokens in the hypothetical concept x, $n_y$ is the number of tokens in the hypothetical concept, and $\in$ is a variable to control the sensitivity of cost on the difference between $n_x$ and $n_y$.

9. The method as claimed in claim 1, wherein in the step of specifying the exemplary token sequence as a plurality of specific concepts, at least one concept rule is used for specifying a composite concept composed of a plurality of specific concepts, and the associated concept recognizer of the composite concept is provided for defining the corresponding relation between the composite concept and the specific concepts being composed.

10. The method as claimed in claim 9, wherein the concept rule is a context-free rule.

11. The method as claimed in claim 9, wherein the step of constructing a preliminary concept graph of the untested token sequence according to the concept candidates further comprises:

constructing a preliminary concept graph of the untested token sequence according to the concept candidates; and converting the preliminary concept graph into a hypothetical concept graph according to the concept rules.

12. The method as claimed in claim 11, wherein in the step of determining an optimal hypothetical concept sequence, the matched target concept is the composite concept.

13. The method as claimed in claim 12, wherein the step of determining an optimal hypothetical concept sequence further comprises:

determining an optimal hypothetical concept sequence by comparing the exemplary concept graph with the preliminary concept graph;

capturing at least one matched target concept from the hypothetical concept sequence; and extracting the targeted data by respectively analyzing specific concepts of each matched target concept.

14. The method as claimed in claim 1, wherein in the step of specifying the exemplary token sequence as a plurality of specific concepts, the target concept is specified by the user.

15. The method as claimed in claim 1, wherein, after the step of specifying the exemplary token sequence as a plurality of specific concepts, the tokens are automatically specified as filler concepts if there are tokens that still have not been specified as specific concepts.

16. The method as claimed in claim 1, wherein the associated concept recognizer is dynamically generated.

17. The method as claimed in claim 1, wherein the associated concept recognizer is predetermined.

18. The method as claimed in claim 1, wherein the associated concept recognizer is provided by a user.

* * * * *